(12) United States Patent
Pope

(10) Patent No.: US 8,919,625 B1
(45) Date of Patent: Dec. 30, 2014

(54) FOOD AND BEVERAGE CADDY FOR A MOTORCYCLE

(71) Applicant: David J. Pope, Dixon, IL (US)

(72) Inventor: David J. Pope, Dixon, IL (US)

(*) Notice: Subject to any disclaimer, the term of this patent is extended or adjusted under 35 U.S.C. 154(b) by 119 days.

(21) Appl. No.: 13/734,220

(22) Filed: Jan. 4, 2013

(51) Int. Cl.
*B62J 7/02* (2006.01)

(52) U.S. Cl.
USPC ............ 224/414; 224/412; 224/413; 224/419

(58) Field of Classification Search
CPC .......... B62J 7/02; B62J 11/00; B60R 2011/00
USPC .................. 224/412–414, 419, 423, 427, 429
See application file for complete search history.

(56) References Cited

U.S. PATENT DOCUMENTS

| | | | | |
|---|---|---|---|---|
| 3,873,010 A | * | 3/1975 | Patterson | 224/275 |
| 3,909,092 A | * | 9/1975 | Kiernan | 312/235.8 |
| D242,685 S | | 12/1976 | Skidell | |
| 4,195,757 A | * | 4/1980 | Jefferson | 224/414 |
| D257,113 S | | 9/1980 | McCaffrey | |
| 4,254,872 A | * | 3/1981 | Garrett | 206/561 |
| 4,260,085 A | * | 4/1981 | Jefferson | 224/414 |
| 4,266,703 A | * | 5/1981 | Litz | 224/443 |
| 4,512,503 A | * | 4/1985 | Gioso | 224/539 |
| 4,659,099 A | * | 4/1987 | Malone | 280/304.1 |
| 4,805,864 A | | 2/1989 | Votta | |
| 4,832,241 A | * | 5/1989 | Radcliffe | 224/275 |
| 4,872,723 A | * | 10/1989 | Kopf | 297/216.1 |
| 4,928,865 A | * | 5/1990 | Lorence et al. | 224/275 |
| 4,932,533 A | * | 6/1990 | Collier | 206/569 |
| 4,942,990 A | * | 7/1990 | White | 224/42.33 |
| 4,974,765 A | * | 12/1990 | Marchetto et al. | 224/275 |
| 5,842,573 A | * | 12/1998 | Halvorsen | 206/569 |
| 6,032,840 A | * | 3/2000 | Gregory | 224/275 |
| 6,176,405 B1 | | 1/2001 | Roach | |
| 6,422,440 B1 | * | 7/2002 | Stone | 224/275 |
| 6,817,501 B1 | * | 11/2004 | Rogers et al. | 224/413 |
| 7,490,886 B1 | | 2/2009 | Walke | |
| 7,604,211 B2 | | 10/2009 | Moore | |
| 8,047,493 B1 | | 11/2011 | Cohen | |
| 2006/0144845 A1 | | 7/2006 | Tavano | |
| 2008/0296329 A1 | * | 12/2008 | Guckes | 224/412 |
| 2009/0127420 A1 | | 5/2009 | Skaggs | |
| 2010/0170924 A1 | * | 7/2010 | Johnson | 224/413 |
| 2010/0243691 A1 | * | 9/2010 | Salisbury | 224/413 |
| 2012/0168476 A1 | * | 7/2012 | Genung | 224/275 |

* cited by examiner

*Primary Examiner* — Brian D Nash
(74) *Attorney, Agent, or Firm* — Robert C. Montgomery; Montgomery Patent & Design

(57) ABSTRACT

A food and beverage caddy comprises a platform that is adapted to be securely placed within an existing touring pack or saddlebag of a motorcycle. The platform comprises a plurality of beverage cup apertures specifically shaped to receive and support standard beverage cups. Support legs elevate the platform above the bottom of the touring pack or saddlebag. Spikes or hook-and-loop fasteners can be used to attach the food and beverage caddy to the touring pack or saddlebag.

5 Claims, 5 Drawing Sheets

FOOD AND BEVERAGE CADDY FOR A MOTORCYCLE

RELATED APPLICATIONS

There are no current co-pending applications.

FIELD OF THE INVENTION

The presently disclosed subject matter is directed motorcycle accessories. More particularly, the present invention relates to motorcycle food and beverage caddies configured to fit within motorcycle luggage.

BACKGROUND OF THE INVENTION

Motorcycles are very popular transportation and recreation vehicles. From enjoyment of the open road to low-cost urban transportation motorcycles have filled transportation needs and endured through the years.

While relatively economical, motorcycles lack the carrying capacity of a car or truck. Because people often need to carry items, one popular enhancement to a motorcycle's utility is motorcycle luggage. Motorcycle luggage is available in a wide range of different varieties from small backpacks, to side bags, to complete luggage systems.

However, while motorcycle luggage provides carrying capacity it does little or nothing to address another limitation of motorcycles: where does one put drink cups? If you have a big, expensive, decked-out, top of the line, well maintained motorcycle the answer is most definitely not on the gas tank. Furthermore, few motorcycles actually have a flat surface to receive a drink cup.

Therefore, a device for holding drink cups on a motorcycle would be beneficial. Even more beneficial would be a drink cup holder that is retained in motorcycle luggage so as to reduce marks left by moisture and cup content. Preferably such a drink cup holder would be removable to allow drinks to be moved from the motorcycle to other locations.

SUMMARY OF THE INVENTION

The principles of the present invention provide for motorcycle drink cup holders that are retained in motorcycle luggage. Those principles further provide for removable motorcycle drink cup holders.

A motorcycle drink cup holder that is in accord with the present invention includes a horizontal platform having cup apertures and is shaped to fit within a cavity of motorcycle luggage. A plurality of channel-shaped support legs are affixed to the bottom of the horizontal platform, and hook-and-loop fasteners are attached to the bottoms of the plurality of channel-shaped support legs. The hook-and-loop fasteners are configured to mate with hook-and-loop fasteners within the cavity.

Beneficially the cup apertures are arranged as two (2) parallel rows of four (4) equally-spaced apertures and at least one (1) cup aperture has a diameter that snuggly supports a plastic beverage cup. The plurality of channel shaped support legs beneficially elevate the horizontal platform approximately three inches (3 in.) and are located alongside the rows of apertures. A plurality of fasteners is used to attach the support legs to the horizontal platform.

Another food and beverage caddy that is in accord with the present invention has a horizontal platform with cup apertures and which is dimensioned to fit within a motorcycle pack. Attached to the bottom of the horizontal platform is a first channel-shaped support leg and a second channel-shaped support leg. A first plurality of spikes extends from the bottom of the first support leg and a second plurality of spikes extends from the bottom of said second support leg. Beneficially, the cup apertures are arranged as two (2) parallel rows of four (4) equally-spaced apertures and with at least one (1) cup aperture having a diameter that snuggly supports a plastic beverage cup. The first channel-shaped support leg and the second channel-shaped support leg elevate the horizontal platform approximately three inches (3 in.) and are located alongside a row of apertures. A plurality of fasteners attach the first channel-shaped support leg and the second channel-shaped support leg to the horizontal platform and another plurality of fasteners attach the plurality of first spikes to the first channel-shaped support leg.

Yet another food and beverage caddy that is in accord with the present invention has a horizontal platform with a row of cup apertures and which is dimensioned to fit within a motorcycle saddlebag. A first channel-shaped support leg is affixed to the bottom of the horizontal platform and a second channel-shaped support leg is affixed to the bottom of the horizontal platform. A first plurality of fasteners attach the first channel-shaped support leg to the horizontal platform while a second plurality of fasteners attach the second channel-shaped support leg to the horizontal platform. At least one (1) cup aperture has a diameter that snuggly supports a plastic beverage cup, and the first channel-shaped support leg and the second channel-shaped support leg elevate the horizontal platform approximately three inches (3 in.). The first channel-shaped support leg and the second channel-shaped support leg are positioned parallel to the row of apertures.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
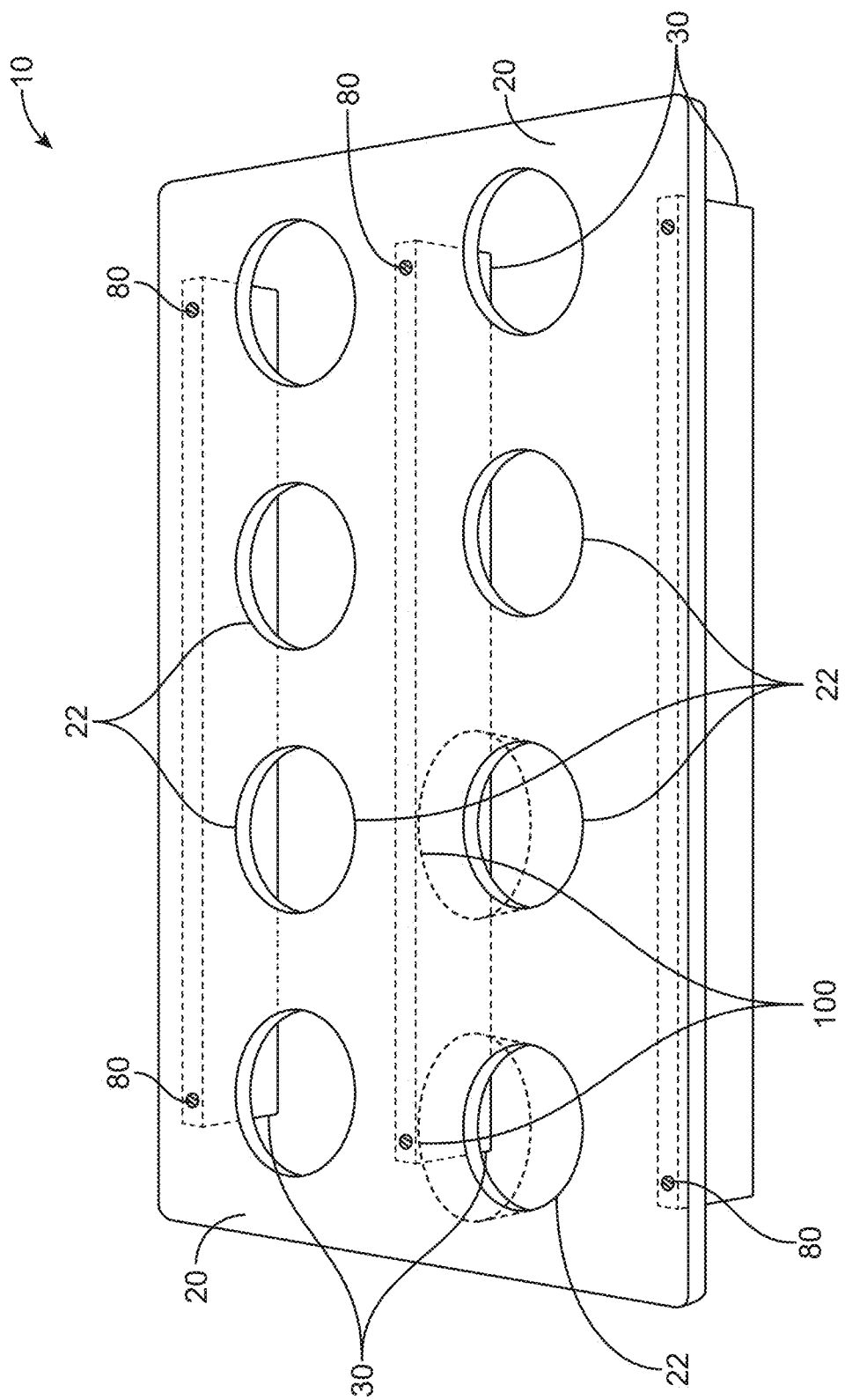
FIG. 1 is a perspective view of a food and beverage caddy for motorcycles 10 that is in accord with the preferred embodiment of the present invention.

DESCRIPTIVE KEY 10 food and beverage caddy
20 platform
22 cup aperture
30 first support leg
80 threaded fastener
82 hook-and-loop fastener
84 spike feature
100 beverage cup
105 touring pack
110 motorcycle
150 spike embodiment
180 second support leg 200 saddlebag embodiment
220 saddlebag platform
230 third support leg

DETAILED DESCRIPTION OF THE PREFERRED EMBODIMENT

Figure 2:
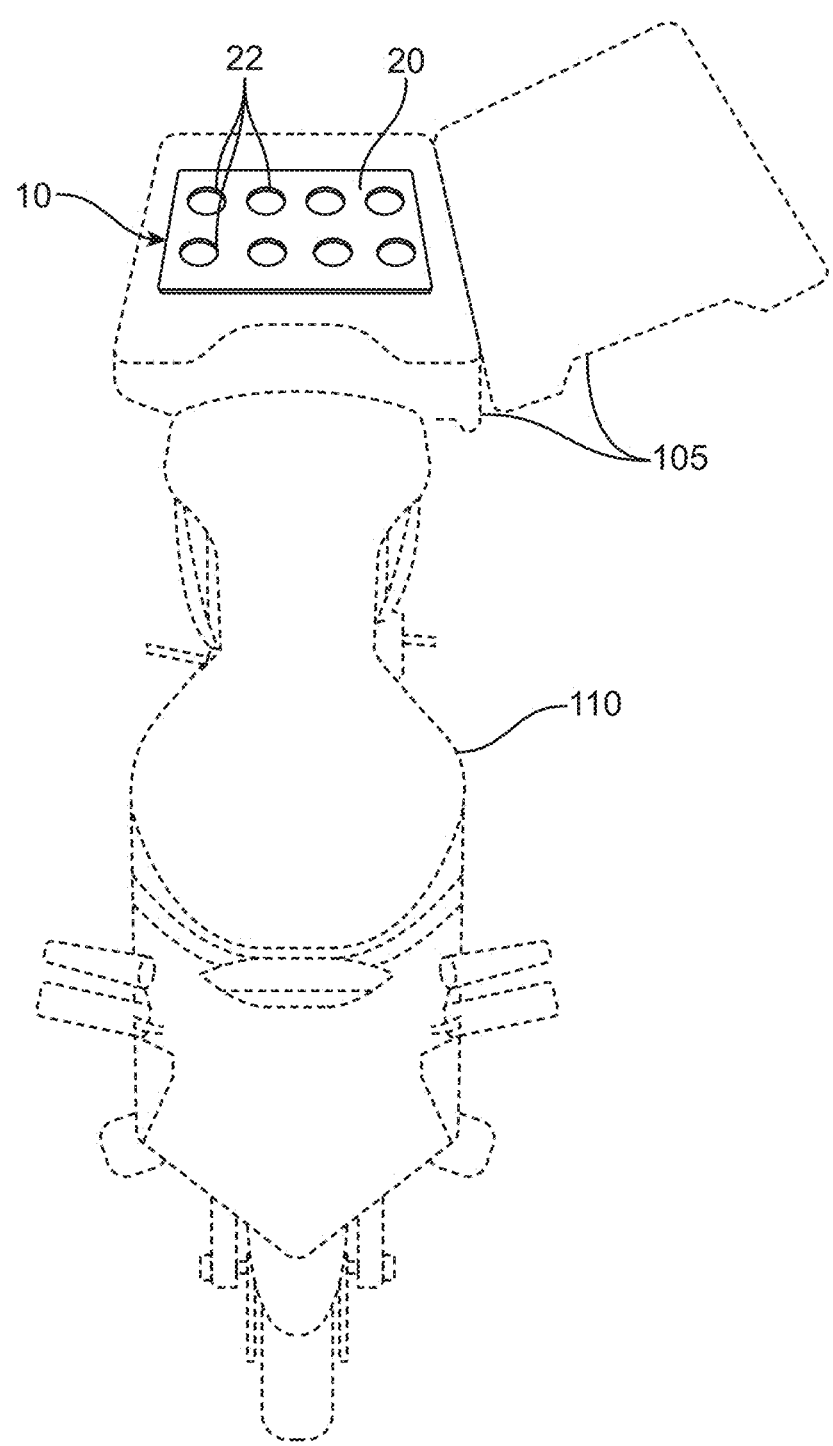
FIG. 2 is an environmental view of the food and beverage caddy 10 shown in FIG. 1 depicting an in-use state upon a motorcycle 110.
Figure 3:
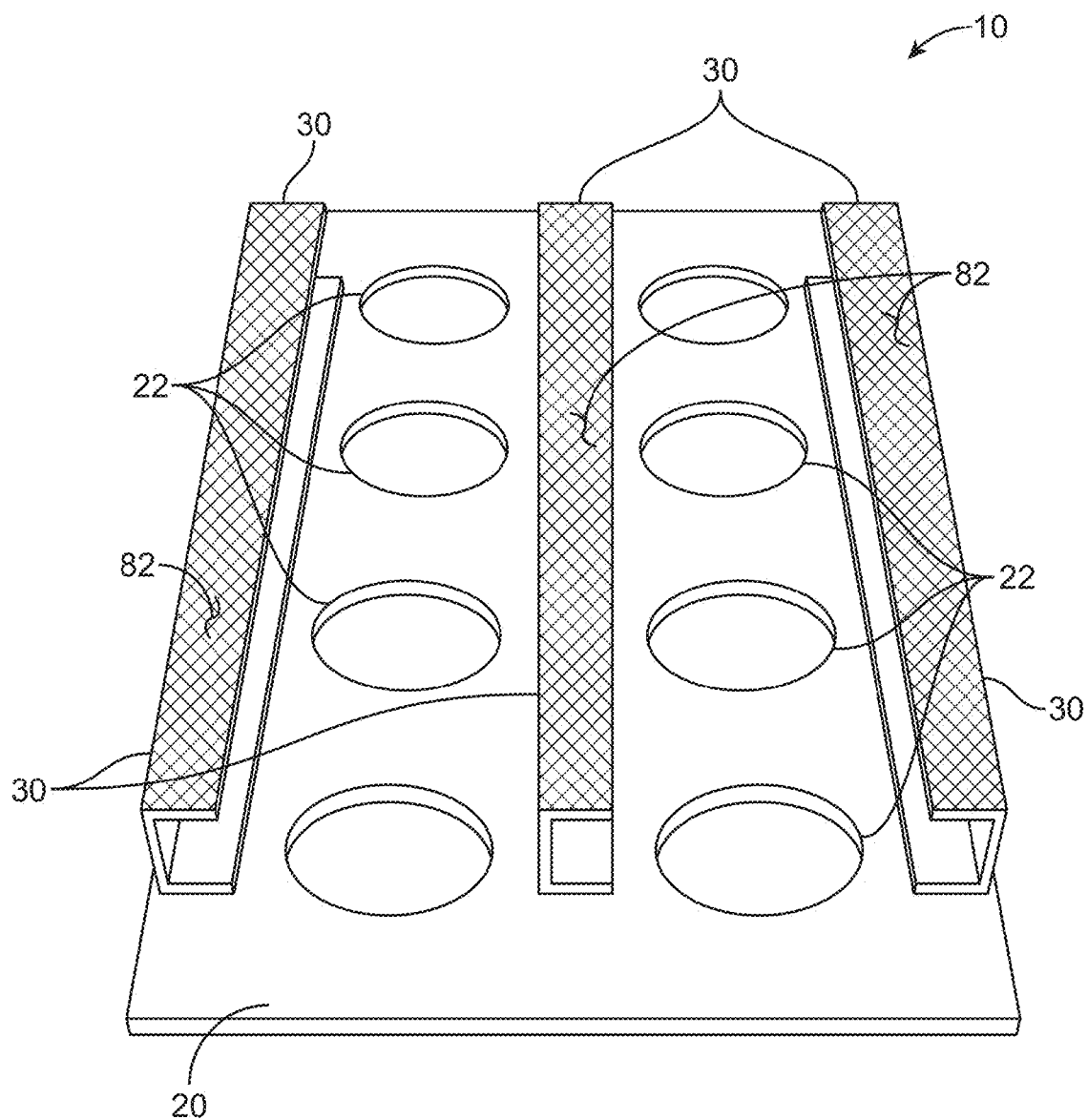
FIG. 3 is a bottom view of the food and beverage caddy 10 shown in FIGS. 1 and 2.
Figure 4:
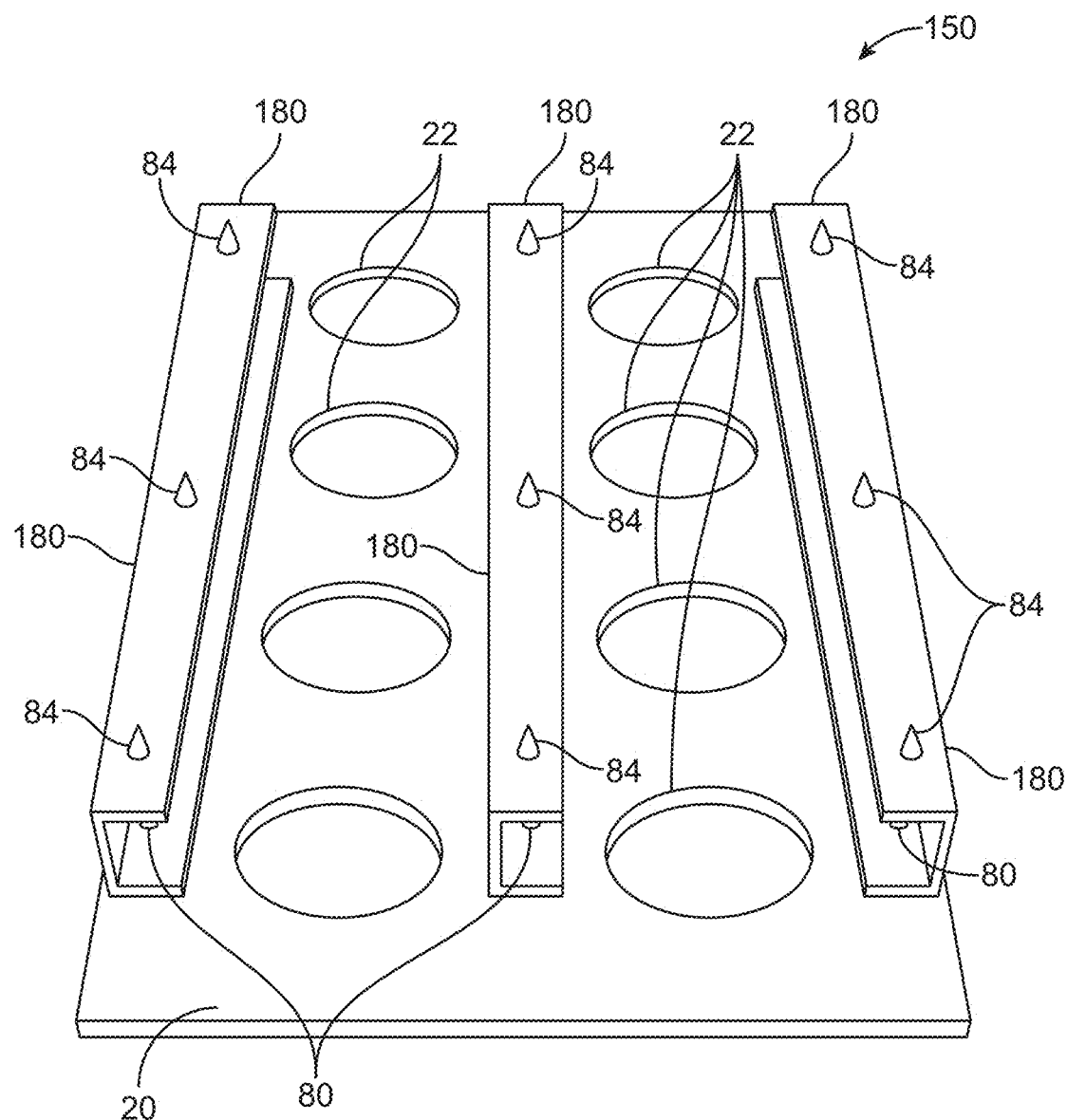
FIG. 4 is a bottom view of a spike embodiment 150 that is in accord with the principles of the present invention; and, FIG. 5 is a perspective view of a saddlebag embodiment 200 that is in accord with the principles of the present invention.
Figure 5:
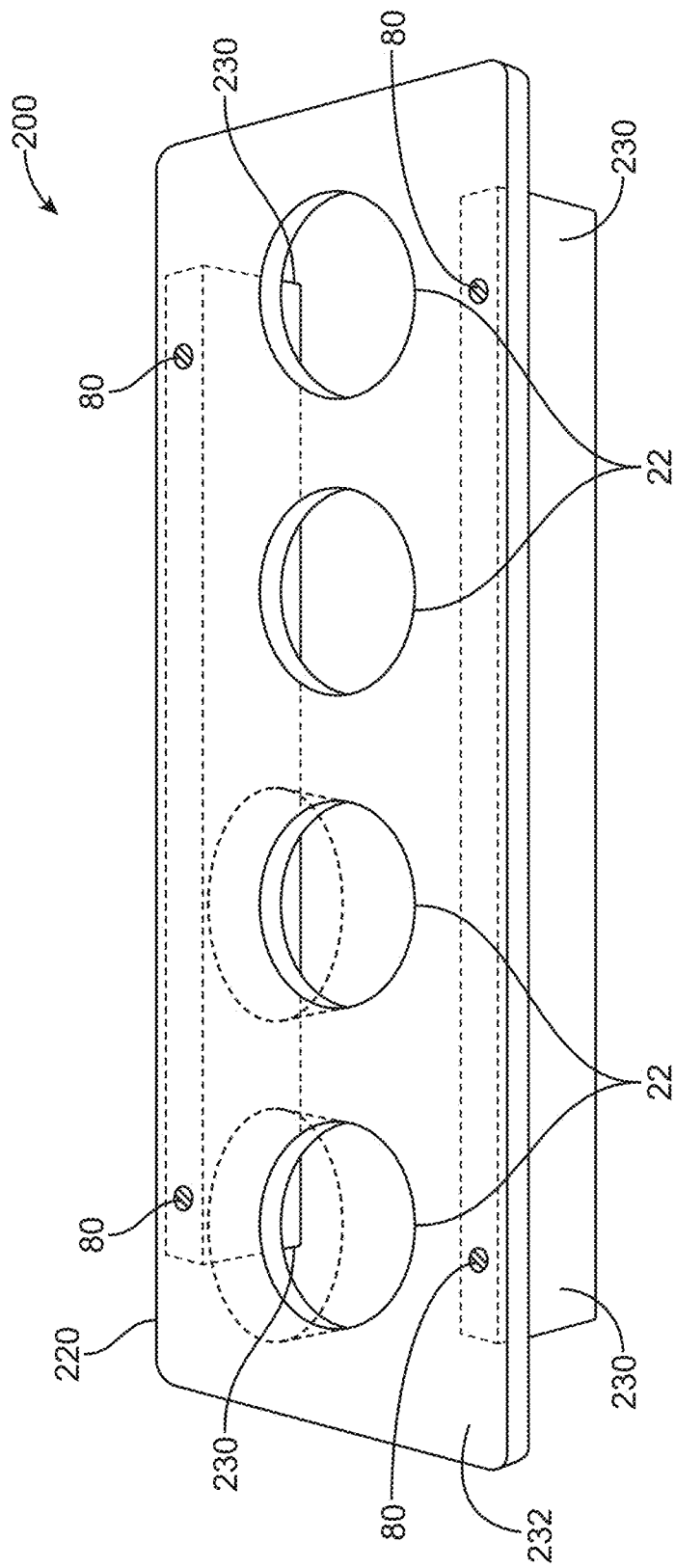

The best mode for carrying out the invention is presented in terms of its preferred embodiment, herein depicted within FIGS. 1 through 3 while alternative embodiments are shown in FIGS. 4 and 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The principles of the present invention provide for food and beverage caddies for motorcycles which enable beverage cups to be securely held on an existing motorcycle.

FIG. 1 presents a perspective view of a food and beverage caddy 10 that is in accord with the preferred embodiment of the present invention. The food and beverage caddy 10 comprises a horizontal platform 20 that is preferably made using an extruded plastic material approximately one-half (½) inch thick Similar resilient materials are also suitable. Referring now to FIG. 2, the platform 20 is envisioned as having an overall shape of an inner cavity of a motorcycle touring pack 105.

The platform 20 includes a plurality of circular cup apertures 22 that are molded, machined, or punched through the platform 20. Preferably the cup apertures 22 are arranged in two (2) parallel rows of four (4) equally-spaced apertures 22. Each aperture 22 beneficially has a diameter that is suitable to snuggly support a standard medium plastic beverage cup 100. However, it should be understood that the food and beverage caddy 10 may be provided with cup apertures 22 having other diameters which correspond to other standard beverage cups 100 or being provided with differing sizes of diameters with equal benefit. Therefore, the specific diameter of the apertures 22 should not be interpreted as a limiting factor of the food and beverage caddy 10.

Referring now to both FIG. 1 and FIG. 2, the platform 20 of the food and beverage caddy 10 is supported and elevated above the bottom of the touring pack 105 approximately three inches (3 in.) by three (3) first support legs 30. Each support leg 30 is a linear, channel-shaped member that is positioned alongside a row or rows of apertures 22. Each support leg 30 is affixed to the bottom of the platform 20 using common fasteners 80 such as rivets, bolts, screws, or the like. Positioning the support legs 30 in this manner enables snug insertion of one (1) or more beverage cups 100 within the aperture 22.

Once inserted, a beverage cup 100 is preferably suspended slightly above the bottom of the touring pack 105. Alternatively the beverage cup 100 may rest on the bottom of the touring pack 105 while being laterally supported within an aperture 22. It is to be further understood that in addition to securely positioning beverage cups 100 or similar cups, it may also be used for food storage or to hold and store various items such as, but not limited to: hardware items, condiments, documents, keys, and the like. In application, the food and beverage caddy 10 is envisioned as being made of durable plastic and introduced in a variety of attractive colors and patterns to suit a user's preference.

Turning now to FIG. 3, the food and beverage caddy 10 further includes rows of hook-and-loop fasteners 82 that are disposed along the bottoms of the support legs 30. Such hook-and-loop fasteners 82 enable the food and beverage caddy 10 to may be removed from the motorcycle 110 via detachment of the hook-and-loop fasteners 82 from corresponding hook-and-loop fasteners (not shown) at the bottom of the touring pack 105. This enables the food and beverage caddy 10 to be used to hold beverage cups 100 and similar items away from the touring pack 105 and the motorcycle 110.

It is understood that the food and beverage caddy 10 would be introduced in a plurality of models having outline shapes which correspond to inner cavities of different touring packs 105 and similar motorcycle-mounted cargo compartment units.

FIG. 4 presents a bottom view of an alternative spike embodiment 150 of the invention. The spike embodiment 150 has the same construction as the preferred embodiment 10 except for the hook-and-loop fasteners 82. Instead of the hook-and-loop fasteners 82 the spike embodiment 150 incorporates support legs 180 (which are the same as the support legs 30), each having multiple spikes 84 which protrude down to grip and stabilize the spike embodiment 150 upon the floor of the touring pack 105. The spikes 84 are retained on the support legs 180 using fasteners 80 (such as screws). When placed within the touring pack 105, each spike feature 84 is slightly embedded into the floor of the touring pack 105 to minimize lateral movement of the spike embodiment 150. The touring pack 105 can be configured with a floor suitable for use with the spike embodiment 150.

FIG. 5 presents a saddlebag embodiment 200 of the invention. The saddlebag embodiment 200 comprises a reduced-width version of the preferred embodiment 10. As such it has two (2) support legs 230 that are positioned along opposing long side edges of a platform 220 of the saddlebag embodiment 200. The platform 220 has a single row of four apertures 22. The saddlebag embodiment 200 is especially suitable for use in long, narrow motorcycle cargo compartments such as hard-shell saddlebags and the like. The saddlebag embodiment 200 is envisioned as being introduced in multiple models having lengths, widths, and support legs 230 configured to work with various saddlebags and other motorcycle cargo compartments. Additionally, it is envisioned that the saddlebag embodiment 200 may be removed from the motorcycle 110 and used in a stand-alone manner to hold beverage cups 100.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be used by the common user in a simple and effortless manner with little or no training After initial purchase or acquisition of the food and beverage caddy 10 it would be installed as indicated in FIG. 2.

The method of using the preferred embodiment food and beverage caddy 10 may be achieved by performing the following steps: procuring a model of the food and beverage caddy 10 comprising a platform 20 which corresponds to a shape of a particular existing touring pack 105 or other cargo compartment mounted to a motorcycle 110; removing or pivoting away the lid of the touring pack 105; installing strips of adhesive-backed hook-and-loop fasteners 82 along a floor of the touring pack 105 as required to correspond to the support legs 30; placing the food and beverage caddy 10 into the touring pack 105 upon the installed hook-and-loop fasteners 82; attaching the food and beverage caddy 10 by pressing gently; using the food and beverage caddy 10 to conveniently hold a desired number of beverage cups 100 inserted into respective apertures 22; and, benefiting from the ability to safely position multiple beverages within a motorcycle touring pack 105.

The method of using the alternate spike embodiment 150 may be achieved by placing the spike embodiment 150 onto the bottom of the touring pack 105, allowing the spike features 84 to laterally secure the spike embodiment 150; and, using the spike embodiment 150 in a similar manner to the preferred embodiment 10.

The method of using the saddlebag embodiment 200 may be achieved by performing the following steps: procuring a model of the saddlebag embodiment 200 having perimeter dimensions which correspond to a particular saddlebag or similar cargo compartment on a motorcycle 110; placing the saddlebag embodiment 200 onto the floor of the saddlebag; and using the saddlebag embodiment 200 in a similar manner as the preferred embodiment 10 in a similar manner to the preferred embodiment 10.

The embodiments of the food and beverage caddy 10, 150, 200 may also be may be removed from the corresponding cargo compartment and used in a stand-alone manner, if desired, to hold beverage cups 100 and similar items. Additionally, beverage cups 100 may be removed and the various embodiments 10, 150, 200 may be retained within the touring pack 105 or saddlebag while traveling.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A food and beverage caddy, comprising:
    a horizontal platform having cup apertures and dimensioned to fit within a motorcycle pack;
    a first channel-shaped support leg affixed to the bottom of said horizontal platform;
    a second channel-shaped support leg affixed to the bottom of said horizontal platform;
    a first plurality of fasteners attaching said first channel-shaped support leg and said second channel-shaped support leg to said horizontal platform;
    a first plurality of spikes extending from the bottom of said first support leg;
    a second plurality of spikes extending from the bottom said second support leg; and,
    a second plurality of fasteners attaching said first plurality of spikes to said first channel-shaped support leg.

2. The food and beverage caddy according to claim 1, wherein said cup apertures are arranged as two parallel rows of four equally-spaced apertures.

3. The food and beverage caddy according to claim 2, wherein at least one cup aperture capable of supporting a plastic beverage cup therein.

4. The food and beverage caddy according to claim 2, wherein said first channel-shaped support leg and said second channel-shaped support leg are located alongside said rows of apertures.

5. The food and beverage caddy according to claim 1, wherein said first channel-shaped support leg and said second channel-shaped support leg elevate said horizontal platform approximately three inches above said motorcycle pack.

\* \* \* \* \*